United States Patent
Nakamura et al.

(10) Patent No.: US 10,054,981 B2
(45) Date of Patent: Aug. 21, 2018

(54) OVERTURN PREVENTION DEVICE FOR APPARATUS INCLUDING TILTABLE HOUSING

(71) Applicant: FUJITSU LIMITED, Kawasaki-shi, Kanagawa (JP)

(72) Inventors: Yutaka Nakamura, Atsugi (JP); Fumihiko Nakazawa, Koube (JP); Nobuhiko Onda, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 248 days.

(21) Appl. No.: 14/666,845

(22) Filed: Mar. 24, 2015

(65) Prior Publication Data
US 2015/0293562 A1 Oct. 15, 2015

(30) Foreign Application Priority Data
Apr. 15, 2014 (JP) .................................. 2014-083981

(51) Int. Cl.
*G06F 1/16* (2006.01)
*H05K 5/00* (2006.01)
*H05K 7/00* (2006.01)

(52) U.S. Cl.
CPC ............ *G06F 1/1616* (2013.01); *G06F 1/166* (2013.01); *G06F 1/1637* (2013.01); *G06F 1/1681* (2013.01)

(58) Field of Classification Search
CPC ...... G06F 1/1616; G06F 1/166; G06F 1/1681; G06F 1/1679; G06F 1/1637
See application file for complete search history.

(56) References Cited

U.S. PATENT DOCUMENTS

| 2003/0140457 A1* | 7/2003 | Kida ..................... G06F 1/1616 16/342 |
| 2005/0050686 A1* | 3/2005 | Kurokawa ............ G06F 1/1618 16/354 |

(Continued)

FOREIGN PATENT DOCUMENTS

| JP | H04-616 | 1/1992 |
| JP | H09-283943 | 10/1997 |

(Continued)

OTHER PUBLICATIONS

Office Action of Japanese Patent Application No. 2014-083981 dated Sep. 26, 2017 (5 Sheets, 4 Sheets translation, 9 Sheets total).

*Primary Examiner* — James Wu
(74) *Attorney, Agent, or Firm* — Kratz, Quintos & Hanson, LLP (57) ABSTRACT

An overturn prevention device for an apparatus including a main body horizontally installed, and a tiltable housing being tiltable relative to the main body by a first rotary shaft incorporated in the main body, the overturn prevention device includes: a second rotary shaft disposed in the main body and extending in a direction vertical to the main body; a rotational force transmission mechanism disposed between the first rotary shaft and the second rotary shaft and configured to rotate the second rotary shaft by transmitting rotation of the first rotary shaft to the second rotary shaft; and an overturn prevention member disposed on the second rotary shaft and configured to protrude from the main body in a tilting direction of the tiltable housing when the second rotary shaft rotates with a tilting operation of the tiltable housing.

13 Claims, 11 Drawing Sheets

(56) References Cited

U.S. PATENT DOCUMENTS

| | | | |
|---|---|---|---|
| 2005/0057894 A1* | 3/2005 | Kim | G06F 1/1616 |
| | | | 361/679.27 |
| 2008/0055837 A1* | 3/2008 | Chueh | G06F 1/1616 |
| | | | 361/679.27 |
| 2011/0047754 A1 | 3/2011 | Takahashi | |

FOREIGN PATENT DOCUMENTS

| | | |
|---|---|---|
| JP | H09-292931 | 11/1997 |
| JP | 2000-47599 | 2/2000 |
| JP | 2004-133160 A1 | 4/2004 |
| JP | 2005-340296 A | 12/2005 |
| JP | 2006-046616 A | 2/2006 |
| JP | 2008-60392 A1 | 3/2008 |
| JP | 2011-047505 A | 3/2011 |

* cited by examiner

GEARS WITH EQUAL
NUMBERS OF TEETH

FIG. 3C

20 TEETH    12 TEETH

41P: 0 deg
42P: 0 deg

FIG. 4D

41P: 30 deg
42P:  0 deg

FIG. 4E

41P: 60 deg
42P:  0 deg

FIG. 4F

41P: 90 deg
42P: 30 deg

FIG. 4G

41P: 120 deg
42P:  60 deg

FIG. 4H

41P: 150 deg
42P:  90 deg

FIG. 5A
0 deg 30 deg

FIG. 5B
90 deg

FIG. 5C
120 deg

FIG. 5D
150 deg

FIG. 9A
0 deg

FIG. 9B
90 deg

FIG. 9C
120 deg

FIG. 9D
150 deg

Arm1
(ROTARY LEG TYPE)

FIG. 10C

Arm2
(ROTARY ARM + SLIDE PLATE TYPE)

OVERTURN PREVENTION DEVICE FOR APPARATUS INCLUDING TILTABLE HOUSING

CROSS-REFERENCE TO RELATED APPLICATION

This application is based upon and claims the benefit of priority of the prior Japanese Patent Application No. 2014-083981, filed on Apr. 15, 2014, the entire contents of which are incorporated herein by reference.

FIELD

The embodiments discussed herein are related to an overturn prevention device of an apparatus including a tiltable housing.

BACKGROUND

In general, an apparatus including a tiltable display unit, such for example as a notebook type personal computer (laptop computer), is unlikely to overturn even when the display unit is opened widely, because the apparatus has a light weight on the display unit side and a heavy weight on a keyboard side incorporating circuits and a battery.

In recent years, besides laptop computers, tablet computers have become popular in which circuits and a battery are incorporated into a display unit side equipped with a touch panel. Hereinafter, the display unit may be also referred to as a display.

No problems occur when such a tablet is used independently. However, in response to a demand that users can make input to a tablet through a keyboard, a thin keyboard connectable to the tablet has been marketed. When the tablet connected to the thin keyboard is used, the barycenter is on a display side because circuits and a battery are incorporated into the tablet (the display side), and therefore the tablet is likely to overturn when the display is opened and tilted.

To suppress occurrence of overturn of an apparatus which includes a display and is likely to overturn when the display is tilted, there are techniques of placing a weight on the keyboard or the stand, and mounting an overturn prevention plate of manual pull-out type.

In the stand of a thin display device, to prevent overturn of the thin display device on a stand, a technique of pulling out an auxiliary baseplate incorporated into a base section of the stand is disclosed in Japanese Laid-open Patent Publication No. 2000-47599.

However, the technique disclosed in Japanese Laid-open Patent Publication No. 2000-47599 has a problem with the operability since the auxiliary baseplate incorporated into the base section of the stand has to be pulled out by the user. To solve the foregoing problem, Japanese Laid-open Patent Publication No. 2004-133160 discloses a technique of automatically sliding and moving a part of the base section on the stand according to tilt of the image display unit so as to increase installation area of the stand.

The technique disclosed in Japanese Laid-open Patent Publication No. 2004-133160 converts rotary motion of a rotary shaft of the image display unit into linear motion via a gear, a cam, a link mechanism and so on, and when the image display unit is tilted, causes an auxiliary plate to protrude from the baseplate so as to suppress occurrence of overturn of the image display unit.

Japanese Laid-open Patent Publication No. 04-616 discloses a technique similar with the technique disclosed in Japanese Laid-open Patent Publication No. 2000-47599, In this technique, an information processing apparatus including a display is provided with a stabilizer provided on the rear side thereof, and is stabilized by pulling out the stabilizer from the inside of the apparatus.

Further, Japanese Laid-open Patent Publication No. 09-292931 discloses a technique of suppressing occurrence of overturn of an information processing apparatus including an LCD panel. Specifically, a first gear is provided on a rotary shaft of the LCD panel, and when the LCD panel is tilted, rotation of the first gear is transmitted to a rack via a second gear, and the rack is caused to protrude behind the rear of the apparatus so as to suppress occurrence of overturn of the apparatus.

However, the techniques disclosed in Japanese Laid-open Patent Publication Nos. 2000-47599 and 04-616 have a problem that operation is complicated since the auxiliary plate and the stabilizer are pulled out manually. The techniques disclosed in Japanese Laid-open Patent Publication Nos. 2004-133160 and 09-292931 have a problem that the overturn prevention mechanisms are large in size because the protrusion length of the auxiliary plate or the rack is determined by the number of teeth of the gear, and the mechanism has to have a gear with a large diameter to secure the protrusion length of the auxiliary plate or the rack.

According to an aspect of the embodiment, it is an object of the present application to provide an overturn prevention device for an apparatus including a tiltable housing, equipped with an overturn prevention mechanism achieving downsizing by causing an overturn prevention piece to protrude by utilizing rotation of a rotary shaft configured to tilt the housing including a display.

SUMMARY

According to an aspect of the invention, an overturn prevention device for an apparatus including a main body horizontally installed, and a tiltable housing being tiltable relative to the main body by a first rotary shaft incorporated in the main body, the overturn prevention device includes: a second rotary shaft disposed in the main body and extending in a direction vertical to the main body; a rotational force transmission mechanism disposed between the first rotary shaft and the second rotary shaft and configured to rotate the second rotary shaft by transmitting rotation of the first rotary shaft to the second rotary shaft; and an overturn prevention member disposed on the second rotary shaft and configured to protrude from the main body in a tilting direction of the tiltable housing when the second rotary shaft rotates with a tilting operation of the tiltable housing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments of the disclosure are described in detail based on specific examples with reference to the accompanying drawings. Like components are described by assigning like numerals.

Figure 1A:
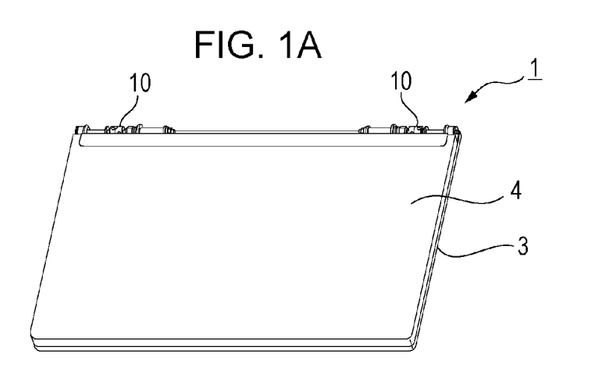
FIG. 1A is a perspective view illustrating a closed state of an apparatus including an overturn prevention device including a rotary leg according to a first embodiment of the disclosure.
Figures 1B, 1C:
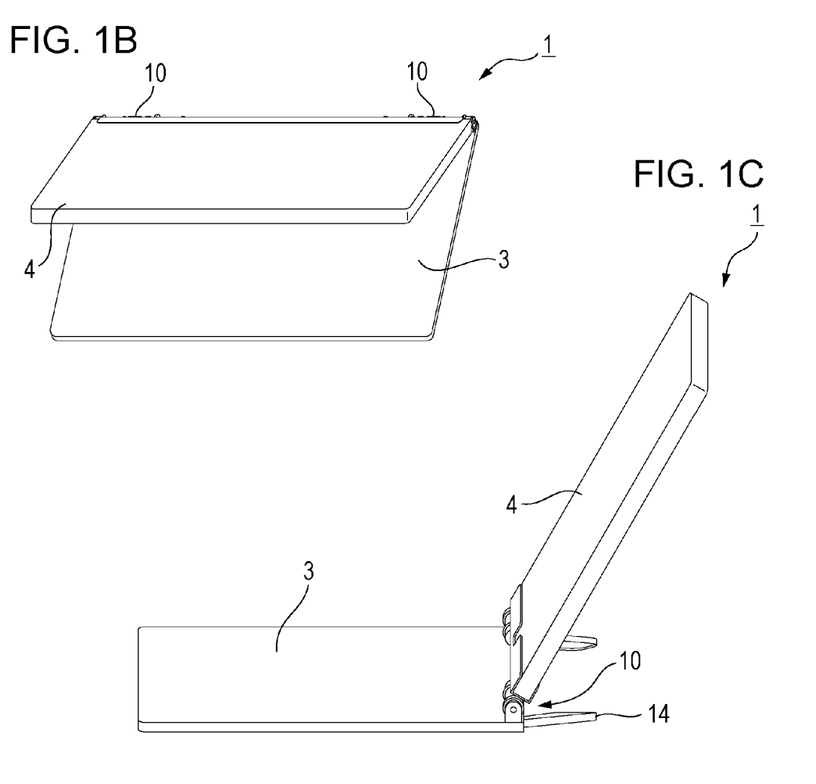
FIG. 1B is a perspective view illustrating a display starting to open with the apparatus in the state illustrated in FIG. 1A.
FIG. 1C is a perspective view illustrating the display of the apparatus further opened and tilted from the state illustrated in FIG. 1B.

FIG. 1A to FIG. 1C illustrate an apparatus 1 according to a first embodiment of the disclosure, including an overturn prevention device 10. The apparatus 1 according to the first embodiment is an openable electronic apparatus including a display 4 (display unit) as a tiltable housing openable relative to a main body 3, and, for example, is a notebook type personal computer. In the apparatus 1, the display 4 can be opened from the closed state illustrated in FIG. 1A to the state opened relative to the main body as illustrated in FIG. 1B, and finally can be tilted as illustrated in FIG. 1C. The overturn prevention device 10 is provided with a rotary arm 14 as a rotary leg which is configured to, when the display 4 is tilted relative to the main body 3, protrude from the main body 3 as illustrated in FIG. 1C so as to suppress occurrence of overturn of the display 4.

Figure 2A:
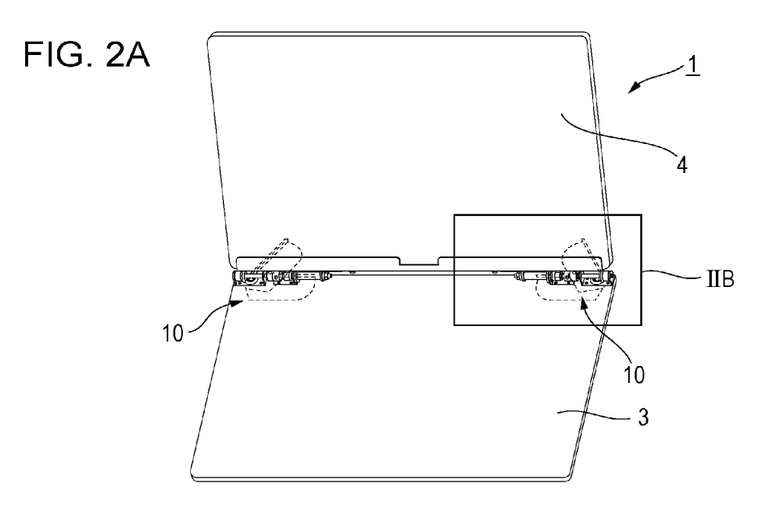
FIG. 2A is a perspective view of the apparatus viewed from the front side of the display, with the display further opened from the state illustrated in FIG. 1B but not yet tilted as illustrated in FIG. 1C.
Figure 2B:
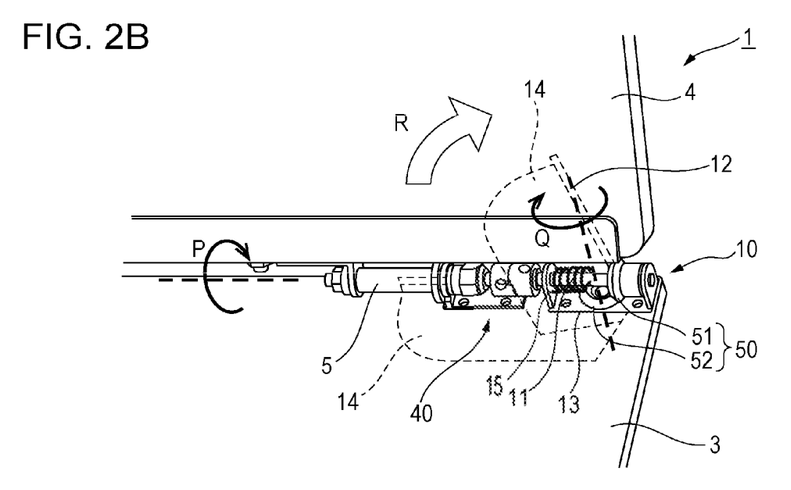
FIG. 2B is a perspective view illustrating an enlarged Section IIB of FIG. 2A.

FIG. 2A illustrates the apparatus 1 viewed from the front side of the display 4, when the display 4 is further opened from the state illustrated in FIG. 1B but not yet tilted as illustrated in FIG. 1C. FIG. 2B is an enlarged Section IIB of FIG. 2A, illustrating the structure of the overturn prevention device 10.

As illustrated in FIG. 2B, the overturn prevention device 10 includes a transmission shaft 11 which is extended from an opening/closing hinge shaft 5 disposed between the main body 3 of the apparatus 1 and the display 4. The opening/closing hinge shaft 5 and the transmission shaft 11 are positioned on a same shaft which is a first rotary shaft incorporated in the main body 3. According to this embodiment, a clutch mechanism 40 is provided in the overturn prevention device 10 to segmentalize the opening/closing hinge shaft 5 and the transmission shaft 11. In the openable apparatus 1, the display 4 is unlikely to overturn even when the display 4 is opened relative to the main body 3 from the state illustrated in FIG. 1A to the state illustrated in FIG. 2A. The clutch mechanism 40 is configured not to transmit any rotation of the opening/closing hinge shaft to the transmission shaft 11 until the display 4 is opened from a closed state to a certain opening angle. Configuration and operation thereof is described below.

The transmission shaft 11 stretches over to a frame 13 of the overturn prevention device 10, and a vertical shaft 12 is provided as a second rotary shaft at a bottom surface of the frame 13. A rotational force transmission mechanism 50 configured to transmit rotation of the transmission shaft to the vertical shaft 12 by converting into the orthogonal direction is provided between the transmission shaft 11 and the vertical shaft 12. The rotational force transmission mechanism 50 according to the embodiment includes a bevel gear 51 attached to the transmission shaft 11, and a bevel gear 52 attached to the vertical shaft 12. The rotary arm 14 configured to protrude rearward from the main body 3 by rotation of the vertical shaft 12 is attached to the vertical shaft 12.

In the overturn prevention device configured as described above, when the display 4 is opened and tilted with the clutch mechanism 40 coupling the opening/closing hinge shaft 5 and the transmission shaft 11 to each other, the opening/closing hinge shaft 5 and the transmission shaft 11 rotate in a direction indicated by the arrow P. When the opening/closing hinge shaft 5 and the transmission shaft 11 rotate in the direction indicated by the arrow P, the bevel gear 52 engaging with the bevel gear 51 rotates in the direction of the arrow Q, and this causes the rotary arm 14 attached to the vertical shaft 12 to rotate in the direction of the arrow R.

Figure 3A:
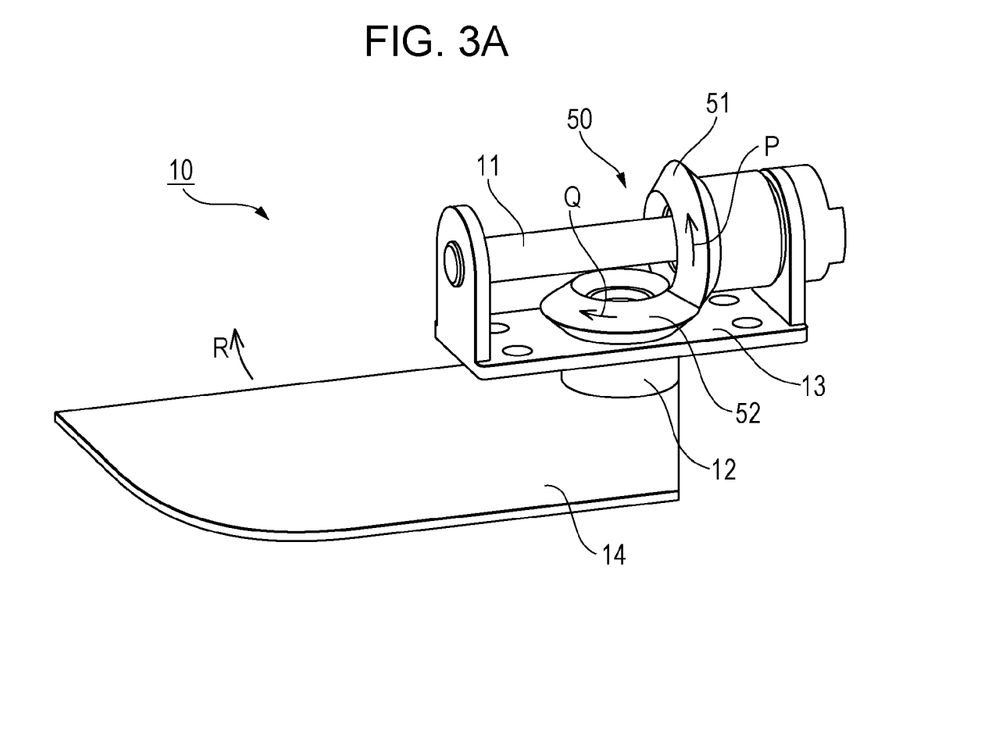
FIG. 3A is a perspective view of a rotational force transmission mechanism extracted from the overturn prevention device illustrated in FIG. 2B.

FIG. 3A illustrates a portion of the overturn prevention device 10 illustrated in FIG. 2B by extracting therefrom the rotational force transmission mechanism 50 only. The transmission shaft 11 stretches over to the frame 13 of the overturn prevention device 10, and the bevel gear 51 is attached to the transmission shaft 11. The vertical shaft 12 is provided at the bottom surface of the frame 13, and the bevel gear 52 is attached to the vertical shaft 12. The bevel gear 51 and the bevel gear 52 engage with each other. Further, a base of the rotary arm 14 is attached to an end face of the vertical shaft 12. As described above, when rotation of the transmission shaft 11 causes the bevel gear 51 to rotate in a direction indicated by the arrow P, the bevel gear 52 engaging with the bevel gear 51 rotates in the direction of the arrow Q, and the rotary arm 14 rotates in the direction of the arrow R.

Figure 3B:
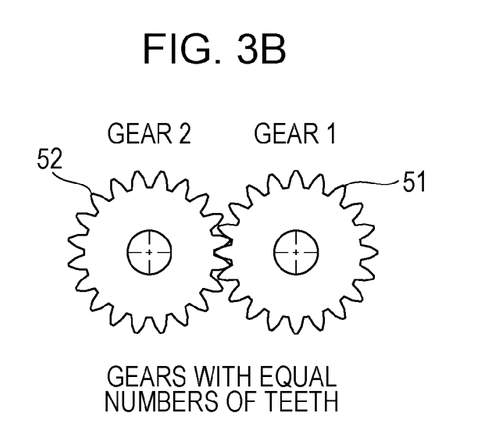
FIG. 3B is an explanatory drawing illustrating an example of the gear ratio of bevel gears illustrated in FIG. 3A.
Figure 3C:
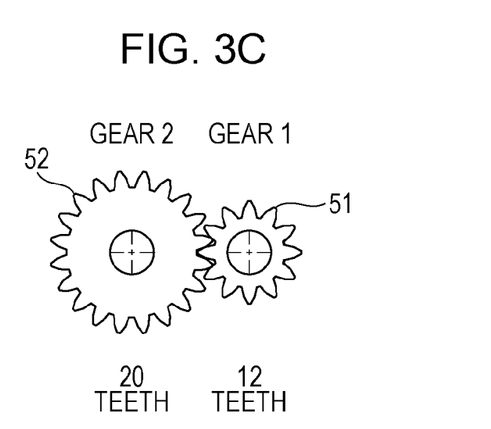
FIG. 3C is an explanatory drawing illustrating another example of the gear ratio of bevel gears illustrated in FIG. 3A.

The gear ratio between the bevel gear 51 and the bevel gear 52 may be equal numbers of teeth as illustrated in FIG. 3B, but the number of teeth of the bevel gear 51 (gear 1) may be smaller than that of the bevel gear 52 (gear 2). In an example illustrated in FIG. 3C, the bevel gear 51 has 12 teeth, while the bevel gear 52 has 20 teeth. With the number of teeth of the bevel gear 51 smaller than that of the bevel gear 52, when the opening angle of the display 4 is 150 degrees, the rotation angle of the rotary arm 14 is 90 degrees, so that the rotary arm 14 can protrude in a direction vertical to the main body 3.

Figure 4A:
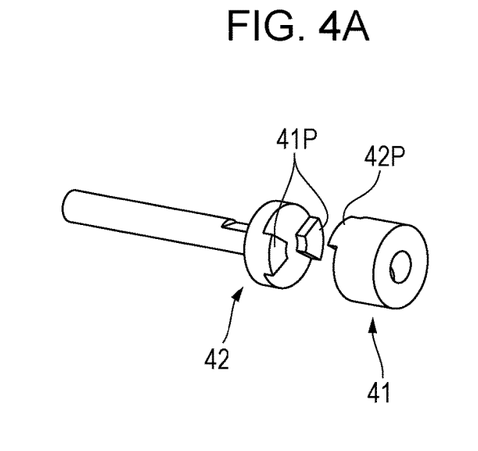
FIG. 4A is a perspective view of a clutch mechanism extracted from the overturn prevention device illustrated in FIG. 2B.
Figure 4B:
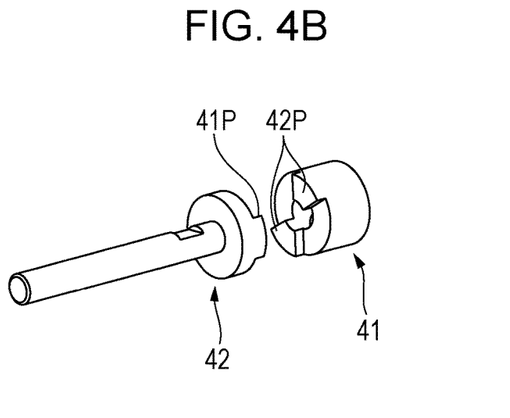
FIG. 4B is a perspective view of the clutch mechanism illustrated in FIG. 2A as viewed from another angle.

Next, the clutch mechanism 40 is described. FIG. 4A and FIG. 4B illustrate the clutch mechanism 40 extracted from the overturn prevention device 10 illustrated in FIG. 2B. The clutch mechanism 40 includes a first clutch 41 connected to the opening/closing hinge shaft 5, and a second clutch 42 connected to the transmission shaft 11. In FIG. 4A and FIG. 4B, frames supporting the first clutch 41 and the second clutch 42 are not illustrated. The first clutch 41 includes two fan-shaped protrusions 42P facing each other, and the second clutch 42 includes two fan-shaped protrusions 41P facing each other. Each of side faces of the protrusions 41P and 42P has two concentric circumferential surfaces, and two planes inclined by 60 degrees to each other.

Here, with reference to FIG. 4C to FIG. 4H and FIG. 5A to FIG. 5D, operation of the first and second clutches 41, 42 of the clutch mechanism 40 and the protrusion amount of the rotary arm 14 from the main body 3 when the display 4 is opened gradually from the main body 3 of the apparatus 1 is described. In drawings illustrated on the right side of FIG. 5A to FIG. 5D, the display 4 is not illustrated.

Figure 4C:
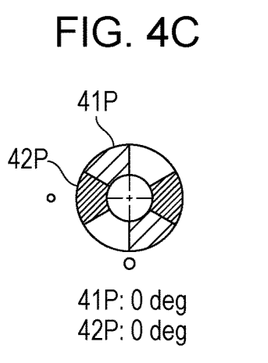
FIG. 4C is a cross section illustrating operation of the clutch mechanism when the display is not opened.
Figure 4D:
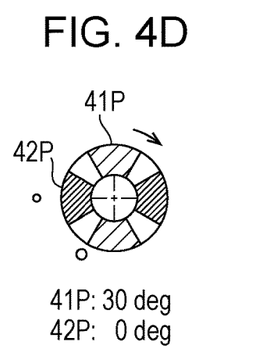
FIG. 4D is a cross section illustrating operation of the clutch mechanism when the display is opened at 30 degrees.
Figure 5A:
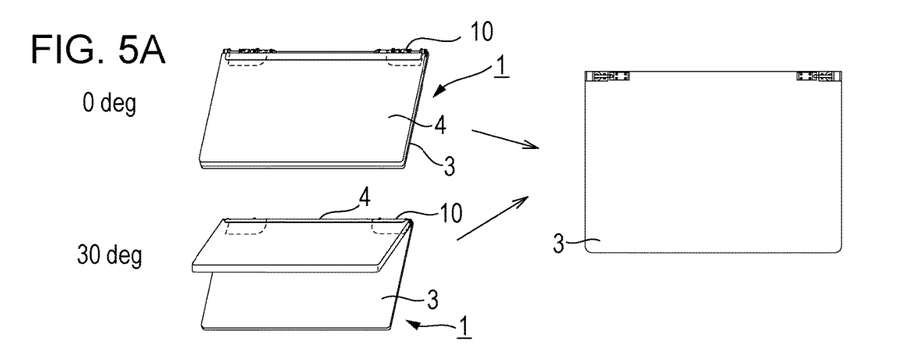
FIG. 5A is an exclusive plan view of an apparatus main body illustrating operation of the rotary leg when the displayed is not opened, and when the displayed is opened at 30 degrees.

The state illustrated on the left upper side of FIG. 5A indicates that the display 4 is closed relative to the main body 3 of the apparatus 1. At this time, the protrusions 41P and 42P of the clutch mechanism 40 are positioned as illustrated in FIG. 4C. Although the protrusions 41P and 42P are in contact with each other, no biasing force is applied to the protrusion 42P by the protrusion 41P. From this state, the display 4 is opened relative to the main body 3 of the apparatus 1 as illustrated on the left lower side of FIG. 5A. The state shown on the left lower side of FIG. 5A is a state of the display 4 opened at 30 degrees relative to the main body 3. At this time, protrusions 41P and 42P of the clutch mechanism 40 are in the state as illustrated in FIG. 4D, in which the protrusion 41P is rotating, and no biasing force is applied to the protrusion 42P.

Figure 4E:
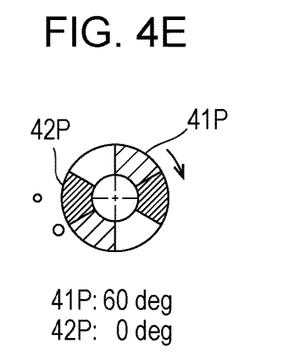
FIG. 4E is a cross section illustrating operation of the clutch mechanism when the display is opened at 60 degrees.

FIG. 4E illustrates a state of the protrusions 41P, 42P when the display 4 is opened at 60 degrees relative to the main body 3. When the display 4 is opened at 60 degrees relative to the main body 3, the protrusion 41P is in contact with the protrusion 42P. Therefore, when the display 4 is opened beyond 60 degrees relative to the main body 3, biasing force is applied to the protrusion 42P by the protrusion 41P, causing the clutch 42 to rotate. Then, rotation of the clutch 42 causes the rotary arm 14 to protrude from the main body 3.

Figure 4F:
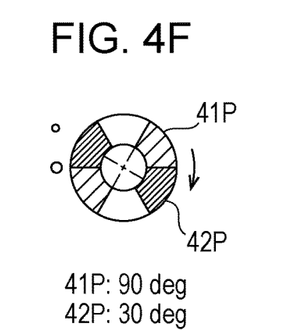
FIG. 4F is a cross section illustrating operation of the clutch mechanism when the display is opened at 90 degrees.
Figure 5B:
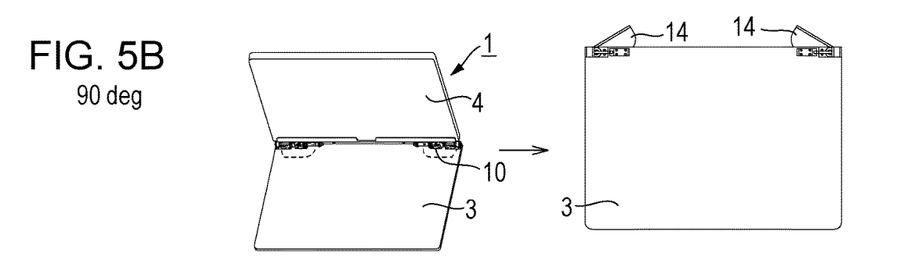
FIG. 5B is an exclusive plan view of the apparatus main body illustrating operation of the rotary leg when the display is opened at 90 degrees.

FIG. 4F illustrates a state of the protrusions 41P, 42P when the display 4 is opened at 90 degrees relative to the main body 3. Since the protrusion 41P rotates by 30 degrees from the state illustrated in FIG. 4E, the protrusion 42P also rotates by 30 degrees. FIG. 5B illustrates a state of the display 4 opened at 90 degrees relative to the main body 3, in which the rotary arm 14 protrudes from the main body 3 by rotating by 30 degrees.

Figure 4G:
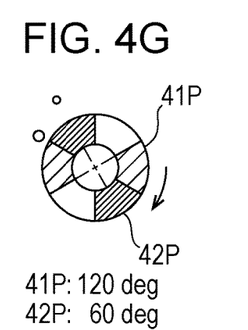
FIG. 4G is a cross section illustrating operation of the clutch mechanism when the display is opened at 120 degrees.
Figure 5C:
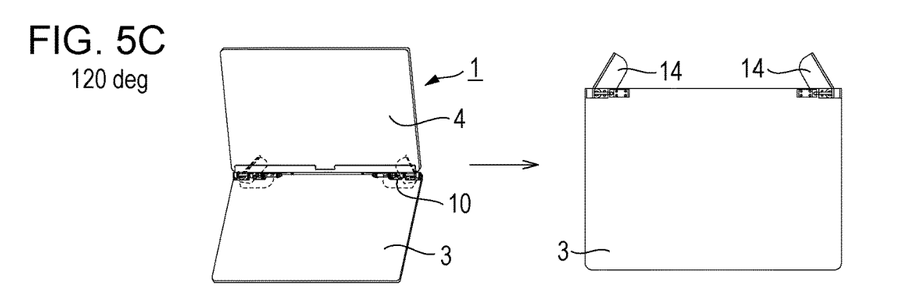
FIG. 5C is an exclusive plan view of the apparatus main body illustrating operation of the rotary leg when the display is opened at 120 degrees.

FIG. 4G illustrates a state of protrusions 41P, 42P when the display 4 is opened at 120 degrees relative to the main body 3. Since the protrusion 41P further rotates by 30 degrees from the state illustrated in FIG. 4F, the protrusion 42P also further rotates by 30 degrees, that is, 60 degrees from the state illustrated in FIG. 4E. FIG. 5C illustrates a state of the display 4 opened at 120 degrees relative to the main body 3, in which the rotary arm 14 protrudes from the main body 3 by rotating by 60 degrees.

Figure 4H:
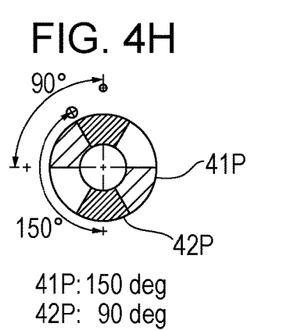
FIG. 4H is a cross section illustrating operation of the clutch mechanism when the display is opened at 150 degrees.
Figure 5D:
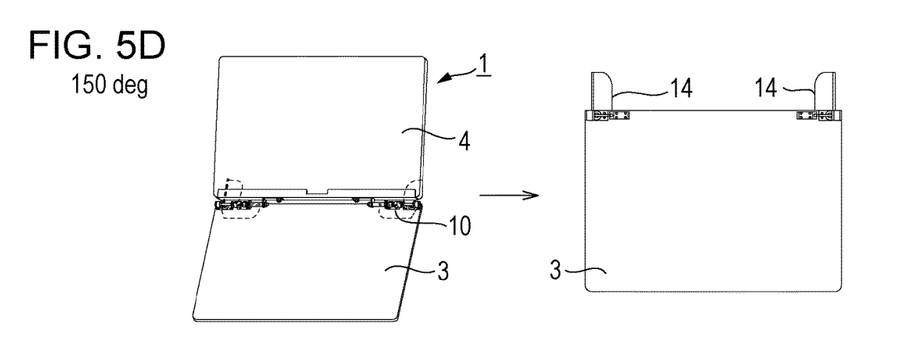
FIG. 5D is an exclusive plan view of the apparatus main body illustrating operation of the rotary leg when the display is opened at 150 degrees.

FIG. 4H illustrates a state of protrusions 41P, 42P when the display 4 is opened at 150 degrees relative to the main body 3. Since the protrusion 41P further rotates by 30 degrees from the state illustrated in FIG. 4G, the protrusion 42P also further rotates by 30 degrees, that is, 90 degrees from the state illustrated in FIG. 4E. FIG. 5D illustrates a state of the display 4 opened at 150 degrees (maximum opening angle) relative to the main body 3, in which the rotary arm 14 protrudes from the main body 3 by rotating by 90 degrees. Thus, when the display 4 is opened to the maximum (150 degrees) relative to the main body 3, the rotary arm 14 protrudes to the maximum in a direction orthogonal to the main body 3 to suppress occurrence of overturn of the display 4.

Figure 6A:
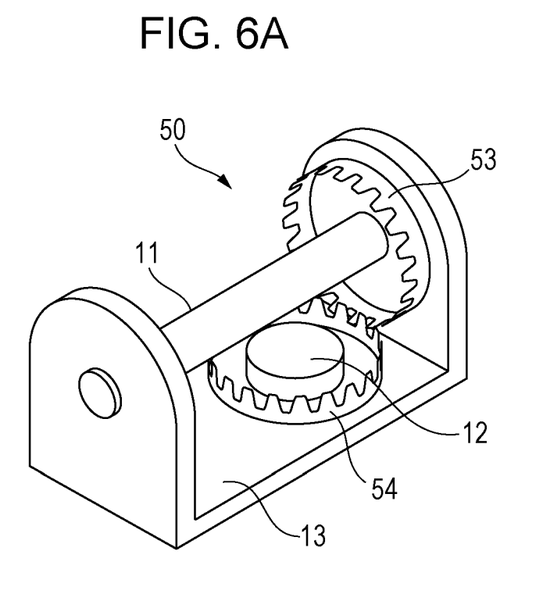
FIG. 6A is a perspective view illustrating another structure of the rotational force transmission mechanism of the overturn prevention device illustrated in FIG. 3A.

FIG. 6A illustrates another structure of the rotational force transmission mechanism 50 of the overturn prevention device 10 illustrated in FIG. 3A. In FIG. 6A, the rotary arm is not illustrated. In the rotational force transmission mechanism 50 illustrated in FIG. 3A, the bevel gear 51 is attached to the transmission shaft 11 stretching over to the frame 13. Further, the bevel gear 52 is attached to the vertical shaft 12 provided at the bottom surface of the frame 13, and the bevel gear 51 and the bevel gear 52 engage with each other. On the other hand, in the example illustrated in FIG. 6A, crown gears 53, 54 are attached to the transmission shaft 11 and the vertical shaft 12, and both crown gears engage with each other. Operation of the crown gears 53, 54 is same as the bevel gears 51, 52. Similarly with the gears 51, 52, the numbers of teeth of the crown gears 53, 54 can be made different.

Although examples of bevel gears and crown gears as the rotational force transmission mechanism 50 of the overturn prevention device 10 are described as above, other structures, for example, such as those specified below, are available as the rotational force transmission mechanism 50:
(1) Combination of a crown gear and a gear
(2) Combination of a worm gear and a gear
(3) Combination of a gear and a pin wheel.

Figure 6B:
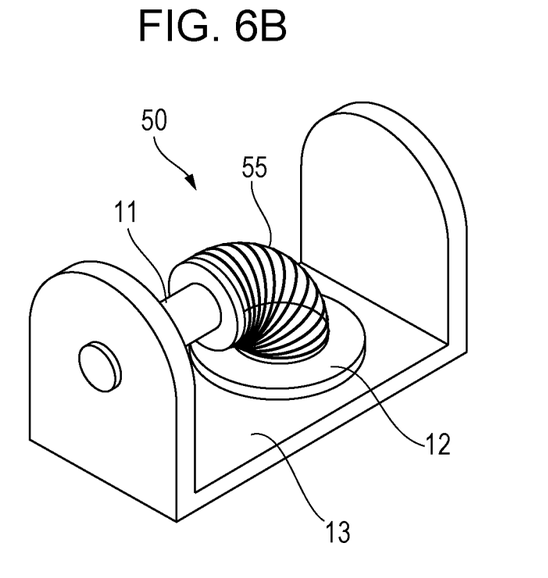
FIG. 6B is a perspective view of still another structure of the rotational force transmission mechanism of the overturn prevention device illustrated in FIG. 3A.

FIG. 6B illustrates still another structure of the rotational force transmission mechanism 50 of the overturn prevention device 10 illustrated in FIG. 3A. Although the rotational force transmission mechanism 50 illustrated in FIG. 3A and FIG. 6A transmits rotation of the transmission shaft 11 to the vertical shaft 12 via a gear, in an example illustrated in FIG. 6B, an end of the transmission shaft 11 and an end of the vertical shaft 12 are connected to each other via a flexible joint 55. The flexible joint 55 may be formed, for example, by an elastic material bendable at 90 degrees, such as a spring material like copper, and a flexible resin. A universal joint also may be used as the flexible joint 55.

Figure 7A:
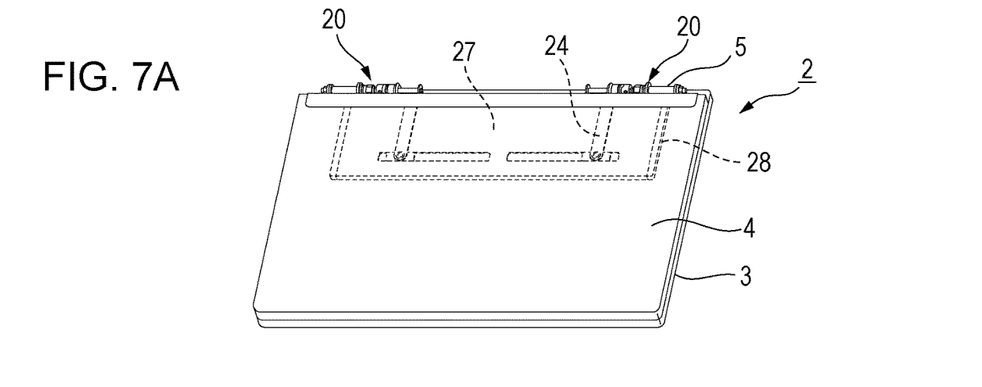
FIG. 7A is a perspective view illustrating a closed state of an apparatus including an overturn prevention device including a sliding plate according to a second embodiment of the disclosure.
Figure 7B:
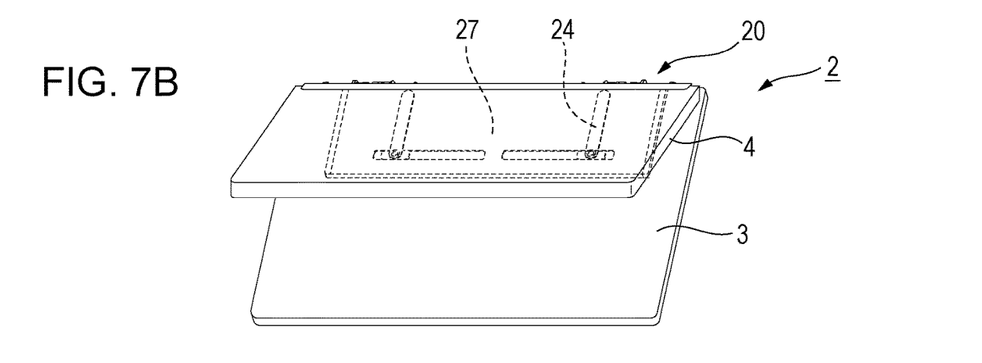
FIG. 7B is a perspective view of the apparatus illustrated in FIG. 7A with a display thereof starting to open.
Figure 7C:
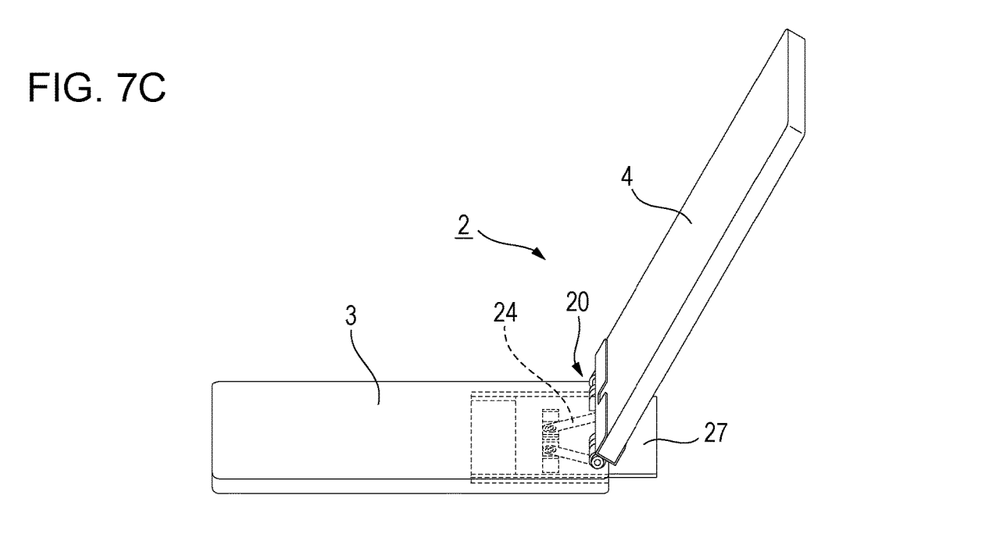
FIG. 7C is a perspective view of the apparatus illustrated in FIG. 7B with the display further opened and tilted.

FIG. 7A to FIG. 7C illustrate an apparatus 2 according to a second embodiment of the disclosure, including an overturn prevention device 20. The apparatus 2 according to the second embodiment is an openable electronic apparatus including an openable display 4 as a tiltable housing, and, for example, is a notebook type personal computer. In the apparatus 2, the display 4 can be opened from a closed state illustrated in FIG. 7A to a state opened relative to the main body 3 as illustrated in FIG. 7B, and finally can be tilted as illustrated in FIG. 7C. The overturn prevention device 20 includes a slide plate 27 driven by a rotary arm 24 as an overturn prevention member which is configured to protrude rearward from the main body 3 as illustrated in FIG. 7C so as to suppress occurrence of overturn of the display 4 when the display 4 is tilted relative to the main body 3.

Figure 8A:
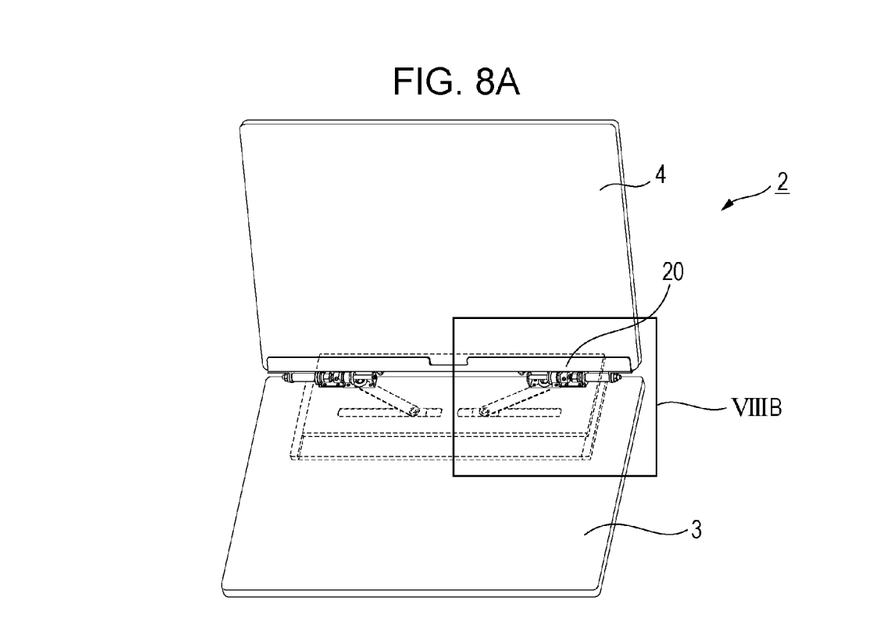
FIG. 8A is a perspective view of the apparatus viewed from the front side of the display, with the display further opened from the state illustrated in FIG. 7B but not yet tilted as illustrated in FIG. 7C.
Figure 8B:
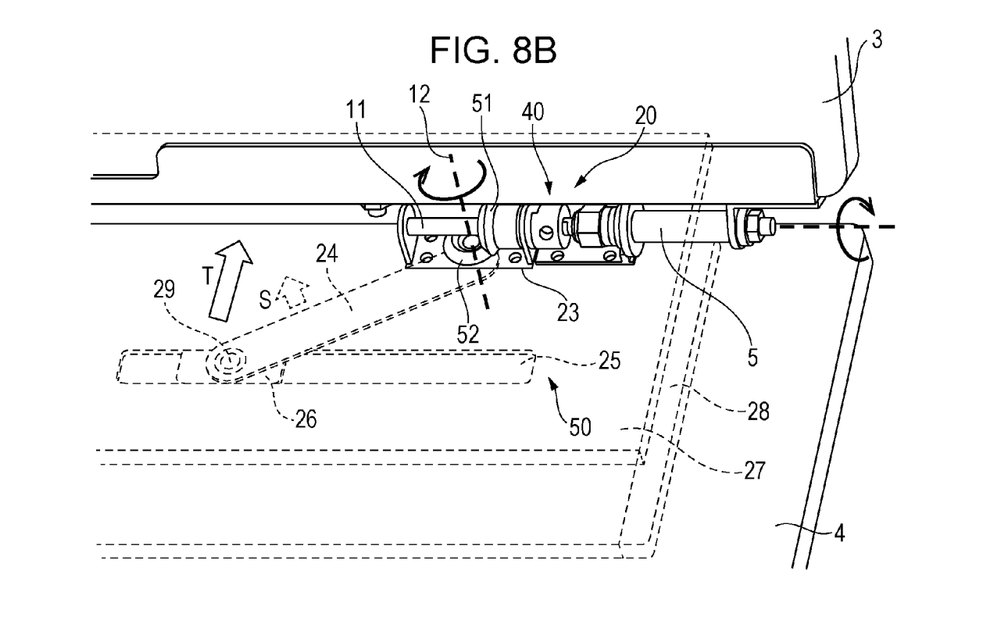
FIG. 8B is a perspective view illustrating an enlarged Section VIIIB of FIG. 8A.

FIG. 8A is the apparatus 2 viewed from the front side of the display 4, when the display 4 is further opened from the state illustrated in FIG. 7B and not yet tilted as illustrated in FIG. 7C. FIG. 8B is an enlarged Section VIIIB of FIG. 8A, illustrating the structure of the overturn prevention device 20.

As illustrated in FIG. 8B, the overturn prevention device 20 includes a transmission shaft 11 which is extended from an opening/closing hinge shaft 5 disposed between the main body 3 of the apparatus 2 and the display 4. The opening/closing hinge shaft 5 and the transmission shaft 11 are positioned on a same shaft which is a first rotary shaft incorporated in the main body 3. According to this embodiment, a clutch mechanism 40 is provided in the overturn prevention device 20 to segmentalize the opening/closing hinge shaft 5 and the transmission shaft 11 by the clutch mechanism 40. In the openable apparatus 2, the display 4 is unlikely to overturn even when the display 4 is opened relative to the main body 3 from the state illustrated in FIG. 7A up to the state illustrated in FIG. 8A, similarly with the openable apparatus 1 described above. The clutch mechanism 40 includes components same as those of the clutch mechanism 40 provided in the apparatus 1.

The transmission shaft 11 stretches over to a frame 23 of the overturn prevention device 20, and a vertical shaft 12 is provided as a second rotary shaft at a bottom surface of the frame 23. The rotational force transmission mechanism 50 configured to transmit rotation of the transmission shaft to the vertical shaft 12 by converting into an orthogonal direction is provided between the transmission shaft 11 and the vertical shaft 12, similarly with the apparatus 1. The rotational force transmission mechanism 50 according to this embodiment includes a bevel gear 51 attached to the transmission shaft 11, and a bevel gear 52 attached to the vertical shaft 12. The rotary arm 24 configured to rotate inside the main body 3 by rotation of the vertical shaft 12 is attached to the vertical shaft 12.

As illustrated in FIG. 7A, when the display 4 is closed relative to the main body 3, the rotary arm 24 extends into the main body 3 in a vertical direction relative to the opening/closing hinge shaft 5 incorporated in the main body 3. In the apparatus 2 according to the second embodiment, a slide plate 27 driven by the rotary arm 24 is incorporated below the rotational force transmission mechanism 50 including the rotary arm 24 of the main body 3. The slide plate 27 is configured to protrude from and retract to the rear side of the main body 3 by sliding forward and rearward between two parallel slide guides 28 incorporated in the main body 3, and serves as the overturn prevention member for the display 4 when protruded from the main body 3.

As illustrated in FIG. 8B, two aligned guide grooves 25 are disposed on the top surface of the slide plate 27 in parallel with the opening/closing hinge shaft 5. A sliding piece 26 movable within the guide grooves 25 is placed in the guide grooves 25. The sliding piece 26 is attached to a tip of the rotary arm 24 by the rotary shaft 29. When the rotary arm 24 rotates in the direction of the arrow S via the rotational force transmission mechanism 50 by tilting of the display 4, the sliding piece 26 moves in the guide grooves 25 in the central direction of the main body 3. This causes the slide plate 27 to move in the direction of the arrow T, and a tip of the slide plate 27 protrudes from the rear part of the main body 3.

Description of the structure of the rotational force transmission mechanism 50 provided in the overturn prevention device 20 of the apparatus 2 according to the second embodiment is omitted since being the same as the structure of the rotational force transmission mechanism 50 provided in the overturn prevention device 20 of the apparatus 1 according to the first embodiment. Also, description of the structure of the clutch mechanism 40 provided in the rotational force transmission mechanism 50 is omitted as being the same as those illustrated in FIG. 4A and FIG. 4B.

Next, with reference to FIG. 4C to FIG. 4H and FIG. 9A to FIG. 9D, operation of the first and second clutches 41, 42 of the clutch mechanism 40, and the protrusion amount of the slide plate 27 from the main body 3 when the display 4 is opened gradually from the main body 3 of the apparatus 4 is described. In drawings illustrated on the right side of FIG. 9A to FIG. 9D, only the main body 3 is illustrated, but illustration of the display 4 is omitted.

Figure 9A:
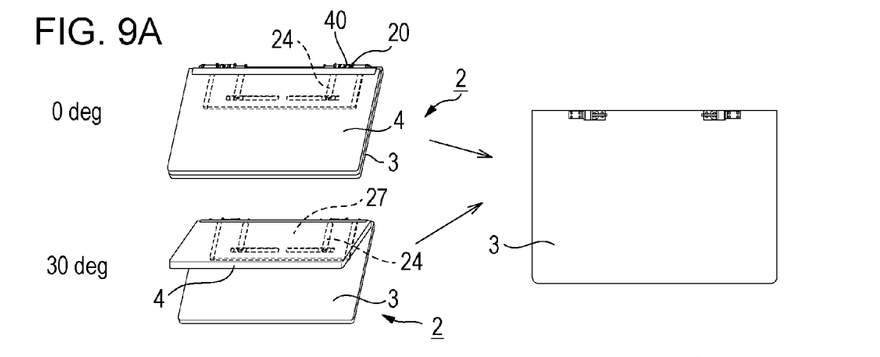
FIG. 9A is an exclusive plan view of an apparatus main body illustrating operation of the slide plate when the display is not opened, and when the display is opened at 30 degrees.

The state illustrated on the left upper side of FIG. 9A indicates that the display 4 is closed relative to the main body 3 of the apparatus 1. At this time, protrusions 41P and 42P of the clutch mechanism 40 are in the state as illustrated in FIG. 4C, in which the protrusion 41P is in contact with the protrusion 42P, but no biasing force is applied to the protrusion 42P by the protrusion 41P. From this state, the display 4 is opened relative to the main body 3 of the apparatus 1 as illustrated on the left lower side of FIG. 9A. The state shown on the left lower side of FIG. 9A is a state of the display 4 opened at 30 degrees relative to the main body 3. At this time, protrusions 41P and 42P of the clutch mechanism 40 are in the state as illustrated in FIG. 4B, in which the protrusion 41P is rotating, and no biasing force is applied to the protrusion 42P.

FIG. 4E illustrates a state of protrusions 41P, 42P when the display 4 is opened at 60 degrees relative to the main body 3. When the display 4 is opened at 60 degrees relative to the main body 3, the protrusion 41P is in contact with the protrusion 42P. Therefore, when the display 4 is opened beyond 60 degrees relative to the main body 3, biasing force is applied to the protrusion 42P by the protrusion 41P, causing the clutch 42 to rotate. Then, rotation of the clutch 42 causes the rotary arm 24 to rotate according to the rotation angle thereof, and causes the slide plate 27 to protrude from the main body 3.

Figure 9B:
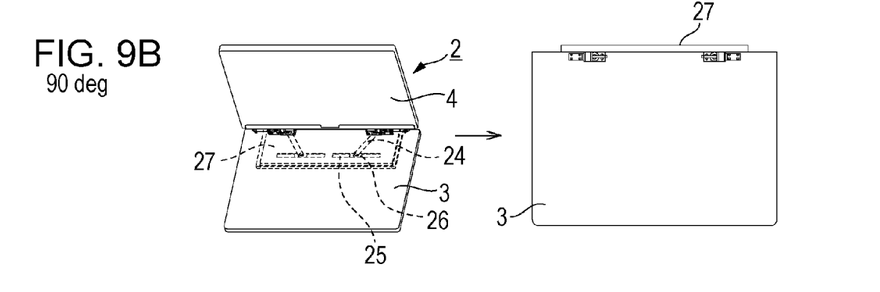
FIG. 9B is an exclusive plan view of an apparatus main body illustrating operation of the slide plate when the display is opened at 90 degrees.

FIG. 4F illustrates a state of protrusions 41P, 42P when the display 4 is opened at 90 degrees relative to the main body 3. Since the protrusion 41P rotates by 30 degrees from the state illustrated in FIG. 4E, the protrusion 42P also rotates by 30 degrees. FIG. 9B illustrates a state of the display 4 opened at 90 degrees relative to the main body 3, in which the rotary arm 24 rotates by 30 degrees to move the sliding piece 26 inward in guide grooves 25, causing the slide plate 27 to protrude slightly from the main body 3.

Figure 9C:
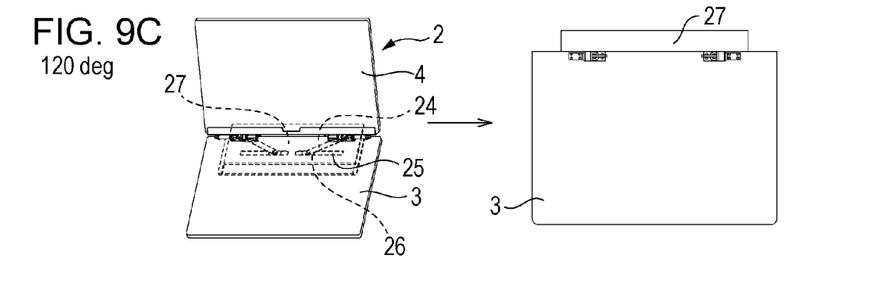
FIG. 9C is an exclusive plan view of an apparatus main body illustrating operation of the slide plate when the display is opened at 120 degrees.

FIG. 4G illustrates a state of protrusions 41P, 42P when the display 4 is opened at 120 degrees relative to the main body 3. Since the protrusion 41P further rotates by 30 degrees from the state illustrated in FIG. 4F, the protrusion 42P also further rotates by 30 degrees, that is, 60 degrees from the state illustrated in FIG. 4E. FIG. 9C illustrates a state of the display 4 opened at 120 degrees relative to the main body 3, in which the rotary arm 24 rotates by 60 degrees to move the sliding piece 26 further inward in guide grooves 25, and thereby the protrusion length of the slide plate 27 from the main body 3 increases.

Figure 9D:
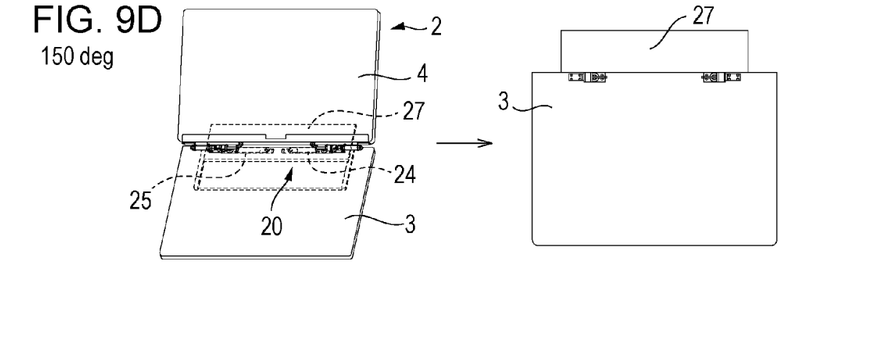
FIG. 9D is an exclusive plan view of an apparatus main body illustrating operation of the slide plate when the display is opened at 150 degrees.

FIG. 4H illustrates a state of protrusions 41P, 42P when the display 4 is opened at 150 degrees relative to the main body 3. Since the protrusion 41P further rotates by 30 degrees from the state illustrated in FIG. 4G, the protrusion 42P also further rotates by 30 degrees, that is, 90 degrees from the state illustrated in FIG. 4E. FIG. 9D illustrates a state of the display 4 opened at 150 degrees (maximum opening angle) relative to the main body 3, in which the rotary arm 24 becomes parallel with guide grooves 25 of the slide plate 27 by rotating by 90 degrees. Thus, when the display 4 is opened to the maximum (150 degrees) relative to the main body 3, the rotary arm 24 becomes parallel with guide grooves 25, causing the slide plate 27 to protrude to the maximum from the main body 3 so as to suppress occurrence of overturn of the display 4.

The apparatus 1 according to the first embodiment and the apparatus 2 according to the second embodiment described above keep the moved barycenter position of the apparatus within the apparatus by causing the rotary arm 14 and the slide plate 27 to protrude rearward of the main body 3 when the display 4 is tilted relative to the main body 3. At this time, since protrusion length of the rotary arm 14 or the slide plate 27 from the main body is long enough relative to the barycenter movement such that the barycenter is positioned inside from the rotary arm 14 or the slide plate 27, overturn of the display can be suppressed. Relationship between the barycenter movement of the openable apparatus and the length of the rotary arm 14 or the slide plate 27 is described with reference to FIG. 10A to FIG. 10D.

Figure 10A:
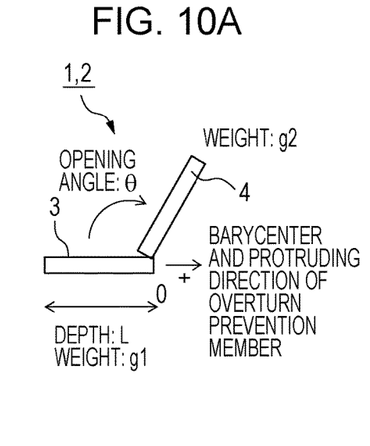
FIG. 10A is an explanatory drawing illustrating the barycenter of the display relative to the main body in the openable apparatus, and the protruding direction of the overturn prevention device.

FIG. 10A illustrates the barycenter of the display 4 relative to the main body 3 and the protruding direction of the overturn prevention member in the openable apparatus 1, 2. Assume g1 as weight of the main body 3, g2 as weight of the display 4, and L as dimension of the main body 3 in the depth direction. Assuming that internal weight is uniform, the barycenter position is located at L/2, the center of respective components. Assuming that the position of the opening/closing hinge shaft is zero, the barycenter position is located at $-L/2$. Barycenter position of the display 4 moves according to the opening angle thereof. When the opening angle is 0, barycenter position is located at $-L/2 \times \cos\theta$. Barycenter position of the apparatus as a whole is the composition (position according to weight ratio) with barycenter of the main body 3, which can be expressed as follows:

Barycenter position=$(L/2) \times ((1-\cos\theta) \times g2/(g1+g2)-1)$ $-1$ in the last term represents unchanged barycenter position of the main body 3, and $g/2(g1+g2)$ in a preceding term represents barycenter position according to the weight ratio between the main body 3 and the display 4, and position from the end of the apparatus is the sum of the barycenter positions. Assuming depth of the apparatus L=210 mm, weight of the main body 3 g1=500 g, and weight of the display 4 g2=980 g, relationship between opening angle θ and barycenter position is shown with a solid line in FIG. 10D.

Figure 10B:
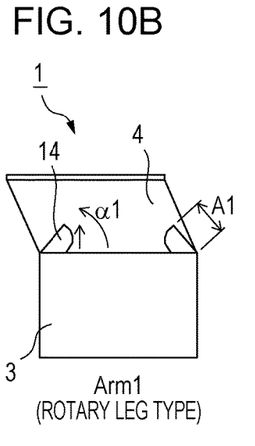
FIG. 10B is an explanatory drawing illustrating the protruding direction of the rotary arm in the overturn prevention device of the apparatus according to the first embodiment of the disclosure.
Figure 10C:
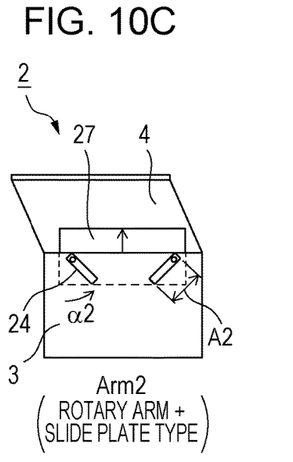
FIG. 10C is an explanatory drawing illustrating the protruding direction of the slide plate in the overturn prevention device of the apparatus according to the second embodiment of the disclosure.

For the rotary arm 14 used as the overturn prevention member like the apparatus 1 illustrated in FIG. 10B, assuming that the initial angle is 0 degree (parallel with the rear end of the apparatus 1) and length of the rotary arm 14 is A1, protrusion amount of the rotary arm 14 is $A1 \times \sin\theta$ when the opening angle of the display 4 is α. For the slide plate 27 used as the overturn prevention member like the apparatus 2 illustrated in FIG. 10C, assuming that the initial angle is −90 degrees and arm length of the rotary arm 24 is A2, protrusion amount of the slide plate 27 is $A2 \times (1-\cos\theta)$ when the opening angle of the display 4 is α.

Figure 10D:
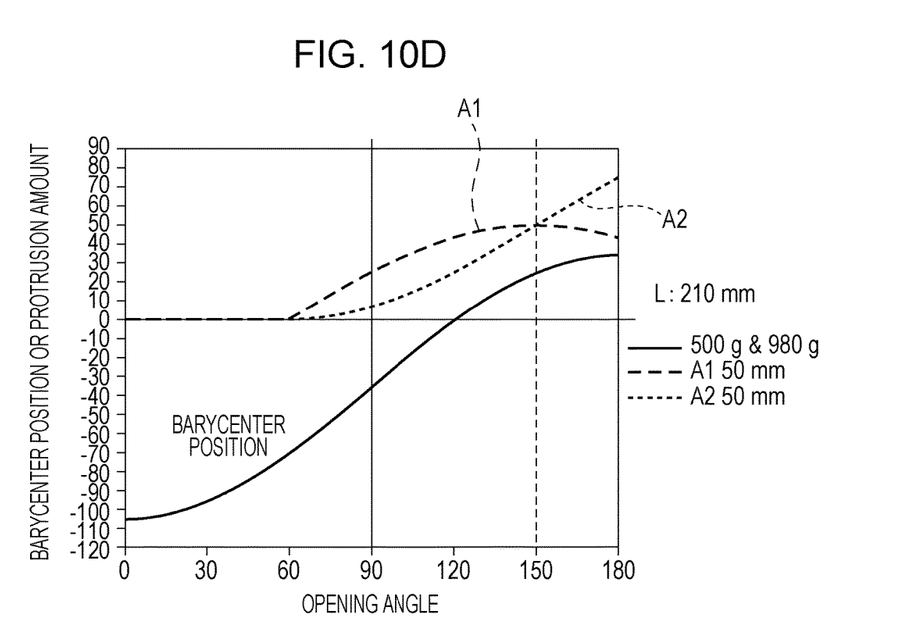
FIG. 10D is a diagram illustrating transition of appropriate values of the protrusion amount of the rotary arm and the slide plate relative to the center of the gravity of the openable apparatus illustrated in FIG. 10A.

Assuming that the play angle of the display 4 not causing the overturn prevention member to protrude is 60 degrees and lengths A1 and A2 of the overturn prevention members are 50 mm, protrusion amount of the overturn prevention member is indicated by dashed lines A1 and A2 of the diagram illustrated in FIG. 10D. As apparent from the diagram, the moved barycenter position is kept inside the protruded rotary arm 14 and the protruded slide plate 27, that is, within the apparatus, so that the apparatus is unlikely to overturn.

In the apparatus 1 illustrated in FIG. 10B, when the display 4 is opened beyond 150 degrees, the rotary arm 14 rotates in a direction retracting to the main body 3, and thereby protrusion amount of the rotary arm 14 from the main body 3 becomes smaller. In such a case, the apparatus 1 may be modified to a structure not allowing the display 4 to open beyond 150 degrees. Although the above calculation is based on the assumption that weight of the overturn prevention member is light, and there is no change in the barycenter, further effect can be expected if a heavy component such as the battery is moved together with the overturn prevention member in the moving direction of the overturn prevention member.

Figure 11A:
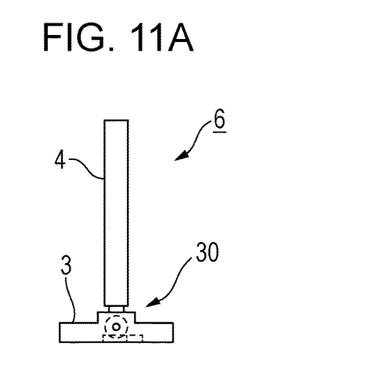
FIG. 11A is a perspective view of an apparatus including an overturn prevention device including a slide plate according to a third embodiment of the disclosure, when the tilt angle is 0.
Figure 11B:
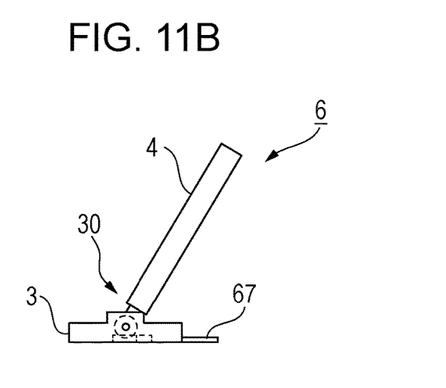
FIG. 11B is a perspective view of the apparatus illustrated in FIG. 11A, when the display is tilted at a predetermined angle.

FIG. 11A to FIG. 11D illustrate an apparatus 6 according to a third embodiment of the disclosure, including an overturn prevention device 30. The apparatus 6 according to the third embodiment is an upright type electronic apparatus used with a display 4 at an upright position relative to a main body 3, such as, for example, an LCD TV and a desktop type personal computer. The apparatus 6 is configured such that the display 4 can be moved from an upright state illustrated in FIG. 11A to a tilted state illustrated in FIG. 11B. The overturn prevention device 30 includes a slide plate 67 as an overturn prevention member which is configured to protrude rearward from the main body 3 as illustrated in FIG. 11B so as to suppress occurrence of overturn of the display 4 when the display 4 is tilted relative to the main body 3.

Figure 11C:
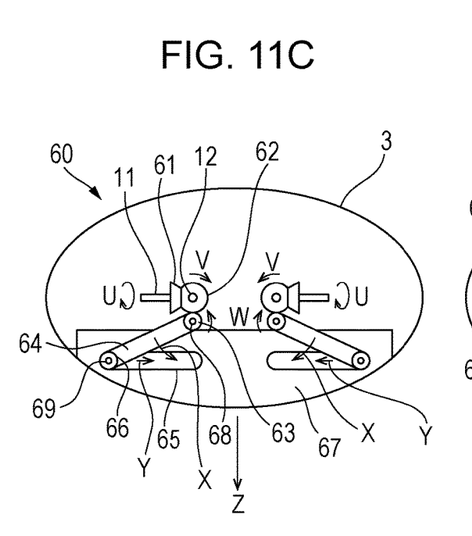
FIG. 11C is a plan view of the main body of the overturn prevention device according to the third embodiment illustrated in FIG. 11A, with the upper cover removed.

As illustrated in FIG. 11C, the overturn prevention device 30 includes a transmission shaft (first rotary shaft) 11 connected to an opening/closing hinge shaft (not illustrated) disposed between the display 4 and the main body 3. In FIG. 11C, illustration of a frame holding the transmission shaft 11 is also omitted. Since the apparatus 6 is an upright type electronic apparatus, the overturn prevention device 30 is not provided with a clutch mechanism. This is because the upright type apparatus 6 is normally used with the display 4 at the upright position as illustrated in FIG. 11A, and the display 4 can be tilted up to a state illustrated in FIG. 11B, but is not closed on the main body 3.

The main body 3 includes a vertical shaft 12 as a second rotary shaft disposed orthogonal to the transmission shaft 11, and a rotational force transmission mechanism 60 configured to transmit rotation of the transmission shaft 11 to the vertical shaft 12 by converting into an orthogonal direction is disposed between the transmission shaft 11 and the vertical shaft 12. The rotational force transmission mechanism 60 includes a first gear 61 attached to the transmission shaft 11, a second gear 62 attached to the vertical shaft 12 and engaging with the first gear 61, and a third gear 63 engaging with the second gear 62. A rotary shaft 68 of the third gear 63 is disposed in the main body 3 in parallel with the vertical shaft 12. The third gear 63 is provided to reverse the rotating direction of the second gear 62 and change the rotation frequency. The rotary arm 64 configured to rotate inside the main body 3 by rotation of the third gear 63 is attached to the third gear 63.

In the apparatus 6 according to the third embodiment, a slide plate 67 driven by a rotary arm 64 is incorporated into the rear part of the main body 3. The slide plate 67 is configured to protrude from and retract to the rear side of the main body 3 and, when protruded from the main body 3, serves as an overturn prevention member for the display 4. Two aligned guide grooves 65 are disposed on the top surface of the slide plate 67 in parallel with the transmission shaft 11, and a sliding piece 66 configured to move in the guide groove 65 is placed within each of the guide grooves 65. The sliding piece 66 is attached to a tip of the rotary arm 64 by the rotary shaft 69. When the display is at the upright position, the sliding pieces 66 are positioned at two far ends of the guide grooves 65.

Figure 11D:
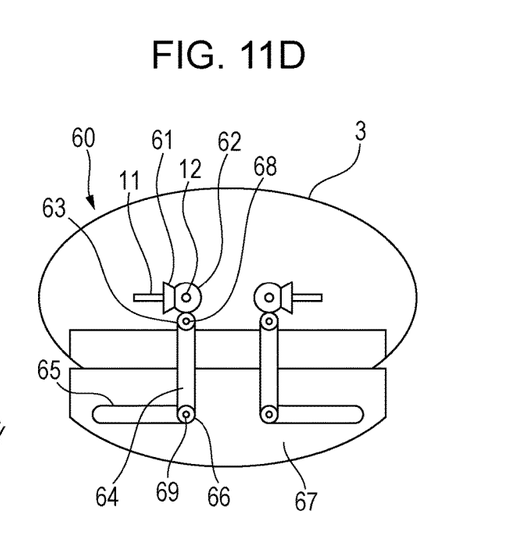
FIG. 11D is a plan view of the main body of the overturn prevention device according to the third embodiment illustrated in FIG. 11B, with the upper cover removed.

When the transmission shaft 11 rotates in the direction of the arrow U by tilting of the display, the second gear 62 rotates in the direction of the arrow V via the rotational force transmission mechanism 60, and the third gear 63 rotates in the direction of the arrow W. When the third gear 63 rotates in the direction of the arrow W, the rotary arm 64 rotates in the direction of the arrow X. When the rotary arm 64 rotates in the direction of the arrow X, the sliding piece 66 moves in the guide groove 65 toward the central direction of the main body 3. This causes the slide plate 67 to move in the direction of the arrow Z, and the slide plate 67 protrudes from the rear part of the main body 3. FIG. 11D illustrates a state of the slide plate 67 protruded to the maximum from the rear part of the main body 3.

According to the third embodiment, another gear, that is, a third gear 63 is disposed also between the second gear 62 and the rotary arm 64, and is configured to rotate reversely such that when the display is tilted, rotation thereof causes the slide plate 67 to protrude rearward. On the other hand, if the first gear 61 attached to the transmission shaft 11 is re-attached to the transmission shaft 11 by reversing rear to front, and the first gear 61 and the third gear 63 are engaged with each other by extending the transmission shaft 11, the second gear 62 is not desired. With this configuration, rotation of the first gear 61 in the direction of arrow U causes the third gear 63 to rotate in the direction of arrow W, and thereby one gear can be saved.

The structure of the rotational force transmission mechanism 60 provided in the overturn prevention device 30 of the apparatus 6 according to the third embodiment is omitted in description since being the same as the structure of the rotational force transmission mechanism 50 provided in the overturn prevention device 20 of the apparatus 1 according to the first embodiment. Thus, the overturn prevention device according to this application for an apparatus including a tiltable housing may be applied to not only an openable electronic apparatus but also an upright type electronic apparatus.

As described above, the overturn prevention device according to this application for an apparatus including a tiltable housing is easy to handle since the overturn prevention mechanism moves in conjunction with opening and closure of the tiltable housing. Direct conversion of opening and closing motion of the tiltable housing to a rotating motion provides a stroke with smooth motion and sufficient length. Further, a simple construction of the overturn prevention device suppresses the cost.

As illustrated in FIG. 2B, a coil spring 15 is attached to the transmission shaft 11 so as to assist return of the overturn prevention member to the main body by a rotating force of the coil spring when the tiltable housing returns to the original state from the tilted state. The coil spring 15 (torsion spring) is wound around the transmission shaft 11, and builds up a returning force when the tiltable housing is tilted, and applies rotation assist force to the transmission shaft 11 in a direction retracting the overturn prevention member into the main body.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An overturn prevention device for an apparatus including a main body horizontally installed, and a tiltable housing being tiltable relative to the main body by a first rotary shaft incorporated in the main body, the overturn prevention device comprising:

a second rotary shaft disposed in the main body and extending in a direction vertical to the main body;

a rotational force transmission mechanism including gears by which to attach to the first rotary shaft and the second rotary shaft, wherein the rotational force transmission mechanism is disposed between the first rotary shaft and the second rotary shaft and configured to rotate the second rotary shaft by transmitting rotation of the first rotary shaft to the second rotary shaft; and an overturn prevention member disposed directly on the second rotary shaft and configured to protrude and rotate from the main body in a tilting direction of the tiltable housing when the second rotary shaft rotates with a tilting operation of the tiltable housing.

2. The overturn prevention device for the apparatus including the tiltable housing according to claim 1, wherein the overturn prevention member is a rotary arm attached to the second rotary shaft.

3. The overturn prevention device for the apparatus including the tiltable housing according to claim 1, wherein the apparatus is a foldable and openable electronic apparatus, and the tiltable housing is provided with a display unit.

4. The overturn prevention device for the apparatus including the tiltable housing according to claim 3, further comprising a clutch mechanism incorporated in the rotational force transmission mechanism, the clutch mechanism including a first clutch and a second clutch, wherein the first clutch is connected to an opening/closing hinge shaft and the second clutch is connected to the transmission shaft, and wherein the clutch mechanism prevents rotation of the first rotary shaft from being transmitted to the second rotary shaft until the tiltable housing is opened at a predetermined angle to the main body.

5. The overturn prevention device for the apparatus including the tiltable housing according to claim 4, wherein the predetermined angle is 60 degrees.

6. The overturn prevention device for the apparatus including the tiltable housing according to claim 1, wherein the apparatus is an image display unit including the tiltable housing provided with a display unit, and the tiltable housing is tilted from a state vertical to the main body.

7. The overturn prevention device for the apparatus including the tiltable housing according to claim 1, wherein the gears of the rotational force transmission mechanism include a bevel gear attached to the first rotary shaft, and a bevel gear attached to the second rotary shaft, or the gears of the transmission mechanism include a crown gear attached to the first rotary shaft and a crown gear attached to the second rotary shaft.

8. The overturn prevention device for the apparatus including the tiltable housing according to claim 7, wherein the bevel gears attached to the first rotary shaft and the second rotary shaft have equal numbers of teeth, or the crown gears attached to the first rotary shaft and the second rotary shaft have equal numbers of teeth.

9. The overturn prevention device for the apparatus including the tiltable housing according to claim 7, wherein the number of teeth of the bevel gear attached to the first rotary shaft is smaller than the number of teeth of the bevel gear attached to the second rotary shaft, or the number of teeth of the crown gear attached to the first rotary shaft is smaller than the number of teeth of the crown gear attached to the second rotary shaft.

10. The overturn prevention device for the apparatus including the tiltable housing accord to claim 1, wherein at least one of the gears is a worm gear.

11. The overturn prevention device for the apparatus including the tiltable housing according to claim 1, wherein at least one of the gears is a pin wheel.

12. The overturn prevention device for the apparatus including the tiltable housing according to claim 1, wherein a protrusion length of the overturn prevention member is set such that a barycenter position of the apparatus is located inside the apparatus in a state where the tiltable housing is tilted.

13. The overturn prevention device for the apparatus including the tiltable housing according to claim 1, further comprising a torsion spring wound around the first rotary shaft, wherein the torsion spring is configured to build up a returning force when the tiltable housing is tilted, and apply rotation assist force to the first rotary shaft in a direction retracting the overturn prevention member into the main body.

* * * * *